Nov. 27, 1962 P. H. HOUSER 3,065,620
WASHING MACHINE
Filed June 27, 1961
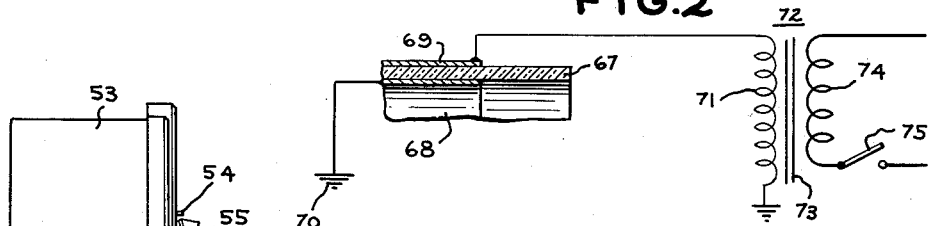
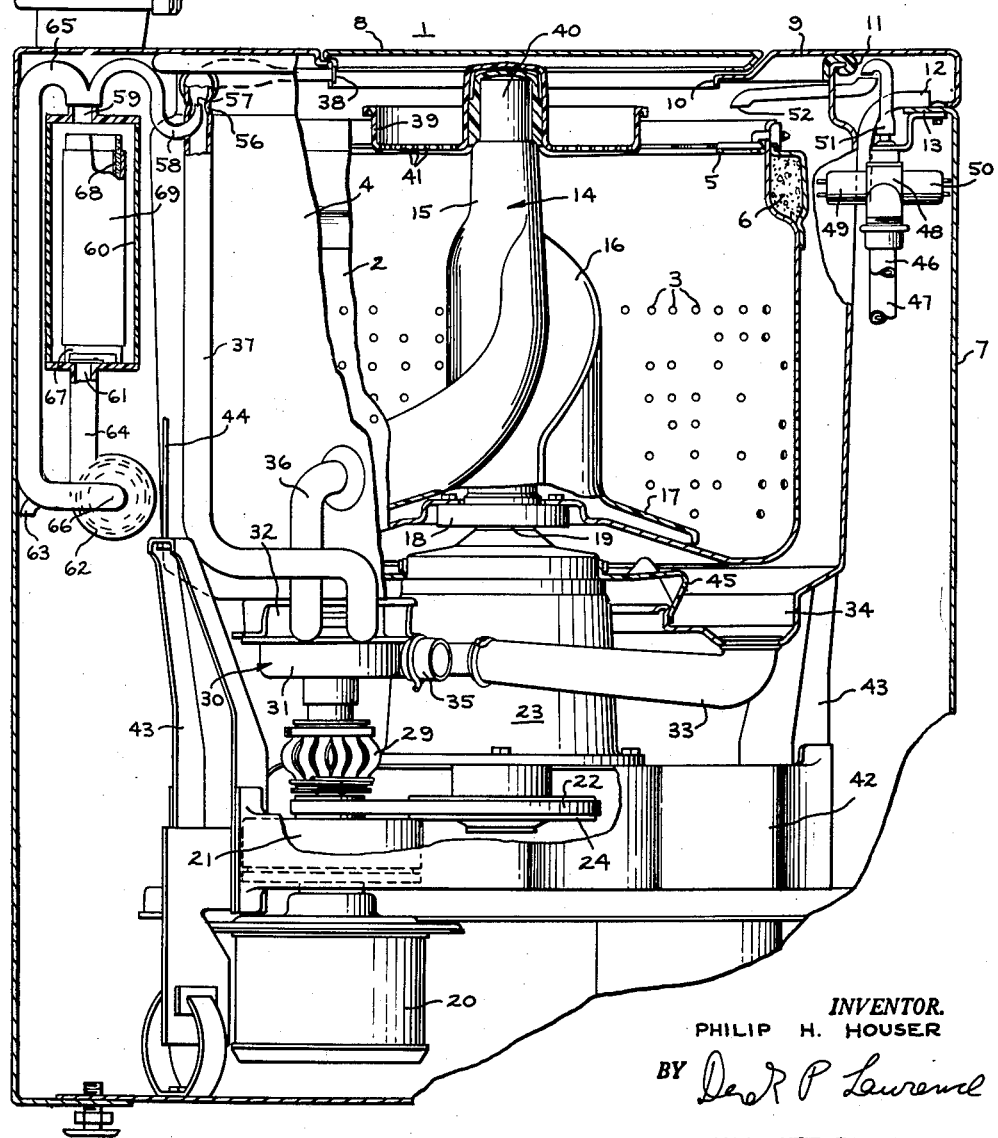
INVENTOR.
PHILIP H. HOUSER
BY *Dex R P Lawrence*
HIS ATTORNEY

3,065,620
WASHING MACHINE
Philip H. Houser, Louisville, Ky., assignor to General Electric Company, a corporation of New York
Filed June 27, 1961, Ser. No. 119,946
5 Claims. (Cl. 68—13)

This invention relates to automatic clothes washing machines, and more particularly to the incorporation of a bleach generating arrangement in washing machines of the type which recirculate water during the washing of the clothes.

It is well known that the substances ozone ($O_3$) and hydrogen peroxide ($H_2O_2$) are bleaching agents in that they have an oxidizing effect upon many chemical materials which, in their unoxidized state, tend to stain fabrics and which become invisible when oxidized. It is further known that these substances, since they contain only hydrogen and oxygen atoms, may be generated from water and air without the need for any additional elements; in this connection it has been determined in the past that suitably designed electric discharge means causes the generation of these oxidizing agents. Thus, these bleaching substances may be generated for use in washing machines, thereby eliminating all need for addition of bleach by the machine operator.

However, the generation of these agents by electric discharge may be relatively slow unless the discharge means assumes a cost, size, and complexity which may be undesirable when compared to the ordinary addition of bleach by an operator; in a single treatment of air or water passing through the field of electric discharge apparatus, only a very small number of parts per million is changed into an oxidizing agent.

Taking all these factors into account, it is an object of my invention to provide a washing machine of the type which recirculates water during the washing operation (such machines are readily commercially available at the present time), wherein the recirculation means is made use of to effect the generation of suitable quantities of bleach for the washing machine without the need for the addition of any substance whatsoever by the operator of the machine.

It is a further more specific object of my invention to achieve this goal by providing an electric discharge device which causes at least one of the oxidizing agents mentioned above to be provided in the recirculation conduit, so that the agent is entrained with the water passing through the recirculation conduit and thereby passes into contact with the main body of water being used to wash the clothes.

In one aspect of my invention, I provide a washing machine which, in the usual manner, has water container means within which is positioned suitable means for flexing clothes so that they may be effectively washed when there is water in the container means. Water is continually recirculated out of the container and then back into it by a pump. Such recirculation arrangements are commonly provided for various reasons; for instance a filter may be included in the recirculation system to remove lint which otherwise could be redeposited on the clothes if it were not removed from the water. So that the recirculation arrangement may be effective, suitable means are provided for operating it simultaneously with the clothes washing or flexing means.

As an important feature of my invention, I provide electric discharge means of any well known type designed to generate the oxidizing agents ozone and hydrogen peroxide from oxygen and water respectively. I so arrange this discharge means relative to the recirculation conduit that it provides the generated oxidizing agents in the recirculation conduit. The agents are then entrained in the recirculated water so as to pass into the container means. By virtue of this arrangement, I am able to generate and add oxidizing agent over a substantial part of a washing operation. Thus, although a relatively small amount of oxidizing agent is, with available equipment, generated and entrained with any one quantity of water passing through the recirculation conduit, a total quantity of oxidizing agent suitable to provide the desired bleaching action is provided in the final analysis.

The subject matter which I regard as my invention is particularly pointed out and distinctly claimed in the concluding portion of this specification. The invention itself, however, both as to its organization and method of operation, may best be understood by reference to the following description taken in conjunction with the accompanying drawing.

In the drawing, FIGURE 1 is a side elevational view of a clothes washing machine including my invention, the view being partially broken away and partially in section to illustrate details; and FIGURE 2 is a schematic representation of a typical electrtic discharge arrangement which may be provided in my improved washing machine.

Referring now to the drawing, and particularly to FIGURE 1, I have shown therein an agitator type clothes washing machine 1 having a conventional basket or clothes receiving receptacle 2 provided over its side and bottom walls with perforations 3 and disposed within an outer imperforate tub or casing 4, the basket 2 and casing 4 forming together container means for containing liquid and clothes to be washed: the liquid retaining function is performed by the imperforate tub 4 while the clothes retaining function is provided by the perforated basket 2. Basket 2 may be provided with a suitable clothes retaining member 5 for preventing clothes from being floated over the top of the basket, and with a balance ring 6 to help steady the basket when it is rotated at high speed within the tub 4.

Tub 4 is rigidly mounted within an appearance cabinet 7 which is arranged so as to substantially enclose the washing machine. The cabinet 7 includes a cover 8 hingedly mounted in the top portion 9 of the cabinet for providing access to an opening 10 to the basket 2. As shown, a gasket 11 may be provided so as to form a seal between the top of tub 4 and portion 9 of the cabinet thereby to prevent escape of moisture and moist air into the cabinet around the tub. The rigid mounting of tub 4 within cabinet 7 may be effected by any suitable means. As a typical example of one such means I may provide a number of strap members 12, each of which is secured at one end to an inturned flange 13 of the cabinet and at its other end to the outside of tub 4. At the center of basket 2 there is positioned a vertical axis agitator generally indicated by the numeral 14 which includes a center post 15 and a plurality of curved water circulating vanes 16 joined at their lower ends by an outwardly flared skirt 17. The agitator 14 represents a means for causing appropriate circulation of liquid within the tub 4 and this in turn causes flexing of clothes contained in the basket 2 so that a mechanical washing action is performed on them.

Both the clothes basket 2 and the agitator 14 are rotatably mounted. The basket is mounted on a flange 18 of a rotatable hub 19, and the agitator 14 is mounted on a shaft (not shown) which extends upwardly through the hub 19 into the center post 15 and is secured to the agitator so as to drive it.

During the cycle of operation of machine 1, water is introduced into tub 4 and basket 2, and the agitator 14 is then oscillated back and forth on its axis, that is, in a horizontal plane within the basket, to wash the clothes therein. Then, after a predetermined period of this washing action, basket 2 is rotated at high speed to extract centrifugally the washing liquid from the clothes and discharge it to drain. Following this extraction operation, a supply of clean water is introduced into the basket for rinsing the clothes and the agitator is again oscillated. Finally, the basket is once more rotated at high speed to extract the rinse water.

The basket 2 and agitator 14 may be driven through any suitable means as the specific transmission means is not a feature of the present invention. By way of example, I have shown them as driven from a reversible motor 20 through a drive including a clutch 21 mounted on the motor shaft. The clutch may be of the conventional type which allows motor 20 to start without a load and then accept the load as it comes up to speed. A suitable belt 22 transmits power to a transmission assembly 23 through a pulley 24. Thus, depending upon the direction of motor rotation, pulley 24 and transmission 23 are driven in opposite directions. The transmission 23 is so arranged that it supports and drives both the agitator drive shaft and basket mounting hub 19. When motor 20 is rotated in one direction the transmission causes agitator 14 to oscillate in a substantially horizontal plane within the basket 2. Conversely, when motor 20 is driven in the opposited irection, the transmission rotates the wash basket 2 and agitator 14 together at said high speed for centrifugal extraction. While the specific type of driving mechanism used does not form part of the invention, reference is made to Patent 2,844,225 issued to James R. Hubbard et al. on July 22, 1958 and owned by General Electric Company, assignee of the present invention. That patent discloses in detail the structural characteristics of a transmission assembly suitable for use in the illustrated machine.

In addition to operating the transmission 23 as described motor 20 also provides a direct drive through a flexible coupling 29 to a pump structure, generally indicated at 30, and which may include two separate pumping units 31 and 32 both operated simultaneously in the same direction by motor 20. Pump 31 has an inlet which is connected by a conduit 33 to an opening 34 formed at the lowermost point of tub 4. Pump 31 also has an outlet which is connected by a conduit 35 to a suitable drain (not shown). The pump 32 has an inlet connected by conduit 36 to the interior of tub 4 and an outlet connected to a conduit 37. Conduit 37 terminates at its upper end in a nozzle 38 positioned to discharge into a filter pan 39 secured on the top portion 40 of agitator 14 so as to be movable therewith. Filter pan 39 includes suitable small openings 41 in its bottom so that water passing thereinto from nozzle 38 then flows down through the openings 41 to join the water and clothes within basket 2. In this manner, the filter pan 39, with its small openings 41, causes lint separated from the clothes during the washing operation to be filtered out of the water, and thus prevents it from being redeposited on the clothes. This type of structure is more fully described and claimed in Patent 2,481,979 issued to Russell H. Colley on September 13, 1949 and assigned to General Electric Company, owner of the present invention.

The pumps 31 and 32 are formed so that when motor 20 rotates in the direction to spin basket 3, the pump 31 draws in liquid from opening 34 through conduit 33 and then discharges it through conduit 35 to drain. In the other direction of rotation of motor 20, pump 32 draws in liquid through conduit 36 and discharges it through conduit 37 and out through nozzle 38 so that it passes through filter pan 39 back into basket 2. The pump 32 thus causes recirculation of liquid through conduit 37 simultaneously with the oscillation of agitator 14 as previously described. In addition, pumps 31 and 32 are formed in the conventional manner so that each one is substantially inoperative in the direction of rotation in which it is not used.

Continuing with the description so that the invention may be observed in a complete operative washing machine, the motor 20, clutch 21, transmission 23, basket 2 and agitator 14 form a suspended washing and centrifuging system which is supported by the stationary structure of the washing machine which includes tub 4 so as to permit isolation of vibrations from the stationary structure; it will be understood that such vibrations occur primarily as a result of high speed spinning of basket 2 and the load of clothes therein as mentioned above. One suitable suspension construction which may be used includes a bracket member 42 with transmission 23 mounted on top thereof and motor 20 mounted to the underside thereof. The bracket member in turn is secured to upwardly extending rigid members 43 and each of the two upwardly extending members 43 is connected to a cable 44 supported from the top of the machine. While only a portion of the suspension system is shown in the drawing, such a vibration isolating system is fully described and claimed in Patent 2,987,190 issued on June 6, 1961 to John Bochan and assigned to General Electric Company, assignee of the present invention.

In order to accommodate the movement that occurs between the basket 2, which forms a part of the moving system, and the tub 4 which is secured to the stationary cabinet 7, tub 4 is joined to the upper part of transmission 23 by a flexible boot member 45. Boot 45 may be of any suitable configuration, many of which are known in the art, to permit relative motion of the parts to which it is joined without leakage therebetween.

Hot and cold water may be supplied to the machine through a pair of conduits 46 and 47 which are adapted to be connected respectively to sources of hot and cold water (not shown). Conduits 46 and 47 extend into a conventional mixing valve structure 48 having solenoids 49 and 50 so that energization of solenoid 49 permits passage of hot water through the valve to a hose 51, energization of solenoid 50 permits passage of cold water to the hose 51, and energization of both solenoids permits passing of hot and cold water in the valve and passage of warm water into hose 51. From the hose 51 the water passes through an air gap into an outlet member 52 leading into the basket 2. The air gap makes it impossible for water to be siphoned from the machine, since this could contaminate the incoming water supply.

Machine 1 may also be provided in the conventional manner with means for deenergizing whichever of valve solenoids 49 and 50 is energized when a suitable amount of water has been provided within tub 4. It will be understood, in this connection, that usually all of the controls for the various operating components of the machine are positioned within a backsplasher or control panel 53 of the machine which is normally positioned at the rear of and above the main part of cabinet 7. Suitable control elements, such as those shown at 54 and 55, extend forwardly from the control panel 53 so that an operator may select different cycles of operation for the machine.

The recirculation conduit 37 includes a necked-down section 56 which, in accordance with the principle commonly used in Venturi meters, causes a decrease in the fluid pressure within conduit 37 at that point. Positioned within tube 37 at necked-down section 56 with its open end 57 facing in the downstream direction is a conduit 58 which communicates at its other end with the outlet 59 from a compartment or receptacle 60 preferably formed of a suitable insulating material. Compartment 60 has an inlet 61, and a blower member generally indicated by the numeral 62 is arranged so that it may draw air in through a conduit 63 and discharge it through a conduit 64 to cause it to enter compartment 60 through inlet 61. It will be understood, in this connection, that the interior of cabinet 7 is not sealed and that conventional atmospheric air, of the type which normally includes a certain amount of moisture, will generally be pulled in through inlet 63 by the blower 62.

In addition to the conduit 58 which communicates with outlet 59 from compartment 60, there is also a conduit 65 which forms a second branch in communication with outlet 59 and which then extends downwardly so that at its other end 66 it forms a second inlet to the blower 62. Thus, air which is passed through compartment 60 is forced by the blower 62 to go partly through the conduit 58 and partly through the conduit 65. The flow through conduit 58 results in substantial part from the aspirating effect of the positioning of the outlet 57 within narrowed portion 56 of the conduits 37, while the flow through conduit 65 is due to the suction exerted at the inlet end 66 of the conduit.

Within compartment 60 there is positioned a suitable electric discharge device which, in the present case, is shown as being of the silent discharge type wherein a hollow glass cylinder 67 has around its inside surface an electrode formed as a cylinder of conductive material 68 and around its outside surface a second electrode formed as a cylinder of conductive material 69. Cylinder 67 is subtantially longer than either of cylinder 68 and 69, as shown, so that it extends beyond the ends thereof.

Referring now to FIGURE 2, conductor 68 is connected to a ground 70, and conductor 69 is connected to the non-grounded side of the high voltage secondary coil 71 of a transformer schematically indicated by the numeral 72. In the conventional manner, transformer 72 has an iron core 73 on which the secondary coil 71 and a primary coil 74 are wound. The primary coil 74 is preferably in series with a switch 75 which may be one of the switches included in the conventional control means of the washer so that energization of primary coil 74 (and consequently the excitation of current in coil 71) is controlled by switch 75. In order to obtain a very high voltage differential across conductors 68 and 69, the transformer 72 may be made in the usual manner where high voltage is desired across the secondary coil; this includes providing a relatively small number of turns of heavy wire in the primary coil 74 and a much larger number of turns of relatively fine wire for the coil 71.

This type of structure provides the desired voltage across coil 71, usually on the order of several thousand volts, sufficient to cause an electrical discharge between conductors 68 and 69. In effect, a silent discharge occurs through the glass cylinder 67, and this discharge results in the emission of ultraviolet radiation of sufficient energy to cause the formation of ozone from oxygen and hydrogen peroxide from water. Thus, ordinary air encountering this ultraviolet radiation will have part of the oxygen therein transformed into ozone and part of its moisture content transformed into hydrogen peroxide.

It will be understood that the electric discharge arrangement shown is intended merely to be typical of those which may be utilized, and is not intended to be exclusive with respect to other arrangements. For instance, one or a battery of conventional ultraviolet lamps may be provided; the only requirement is that the discharge be of the type which causes the ultimate creation of one or both of the oxidizing agents ozone and hydrogen peroxide, it being well known that in the case of hydrogen peroxide a wave length less than about 3000 angstroms is usually necessary, about 1800 to 2000 angstroms usually being considered optimum.

In light of the fact that during operation atmospheric air is being passed through compartment 60 adjacent to the discharge apparatus, oxidizing agent will be formed and will be passed into the conduit 37 through conduit 58, together with the air passing through the conduit 58. The oxidizing agent will then pass through the filter pan 39 and will then be entrained by the water so as to pass with the water through the filter pan 39 and then into the tub 4.

While a relatively small number of parts per million of oxidizing agent is created in any given amount of water passing through compartment 60, it will be apparent that, because the recirculation of water is continuous during a washing operation (the pump 32 being operated in the direction to cause this recirculation whenever agitation occurs), the amount of oxidizing agent or bleach in the water is continually being increased through a washing operation. In addition, the concentration of the oxidizing agent passed into conduit 37 may be increased by the particular regenerative arrangement shown. This results because the air passing through conduit 65 back into the blower and then into compartment 60 has already passed by the discharge apparatus and therefore already has a certain amount of the oxidizing agent therein. As it passes through the compartment 60 again, the relative amount of oxidizing agent is increased again by the action of the electric discharge device. Thus, with the structure shown, air containing a higher amount of oxidizing agent will be passed through conduit 58.

It will be understood that once the oxidizing agent comes into contact with the clothes within basket 2 as a result of being entrained with the water, it has a well known bleaching effect on clothes so that, without any necessity for any addition of anything by the operator, a desired bleaching effect on the clothes is obtained. Of course, my inventive arrangement may be used during the rinse cycle of the washing operation as well as during the initial wash, or even instead of during the initial wash. This is possible because, as opposed to presently used bleaches, there is no residual substance remaining in the clothes after use of the bleaching arrangement.

As previously stated, while a particular type of electric discharge apparatus has been shown the invention is not believed to reside in the particular discharge apparatus used. In addition, it is to be understood that while the structure shown will create mainly ozone and then inject it into the conduit 37, it is also possible to provide a compartment having electric discharge means therein, and then to cause the conduit 37 to pass directly through the compartment. In such a case, conduit 37 within the compartment would be formed of a substance which does not stop the passage of ultraviolet light. With such an alternative structure, instead of ozone being the primary oxidizing agent generated, hydrogen peroxide would be generated directly in the water passing through. In this latter connection, it will be understood that, as is commonly known in the art, the presence of free oxygen in the water would improve the generation of hydrogen peroxide in the water by electric discharge means, and that therefore a suitable aspiration system similar to that shown would preferably be included in such a system upstream of the discharge means.

It will be understood that while in accordance with the patent statutes I have described what at present is considered to be the preferred embodiment of my invention, it will be obvious to those skilled in the art that various changes and modifications may be made therein without departing from the invention, and it is therefore aimed in the appended claims to cover all such changes and modifications as fall within the true spirit and scope of my invention.

What I claim as new and desire to secure by Letters Patent of the United States is:

1. A washing machine comprising: container means for containing water and clothes to be washed; means for flexing clothes in said container; pumping means, recirculation conduit means connected with said pumping means for passing water from said container means through said pumping means and back into contact with the clothes in said container; means for simultaneously operating said flexing means and said pumping means; electric discharge means of the type designed to generate the oxidizing agents ozone and hydrogen peroxide from oxygen and water respectively, said discharge means being arranged relative to said recirculation conduit to provide the generated oxidizing agents in said recirculation conduit for entrainment with the recirculated water into said container means.

2. The apparatus defined in claim 1 wherein said washing machine includes means for aspirating air into the water passing through said recirculation conduit means.

3. The apparatus defined in claim 1 wherein said washing machine includes means for aspirating air into the water passing through said recirculation conduit means, said discharge means being positioned in the path of the aspirated air thereby to change part of the aspirated air into ozone and hydrogen peroxide.

4. A washing machine comprising: container means for containing water and clothes to be washed; means for flexing clothes in said container; pumping means; recirculation conduit means connected with said pumping means for passing water from said container means through said pumping means and back into contact with the clothes in said container means; means for simultaneously operating said flexing means and said pumping means; a compartment including electric discharge means of the type suitable to generate the oxidizing agents ozone and hydrogen peroxide from oxygen and water; air circulating means arranged to pass atmospheric air into said compartment; and connecting conduit means connecting said compartment to said recirculation conduit means for introduction of treated air from said compartment into said recirculation conduit means.

5. A washing machine comprising; container means for containing water and clothes to be washed; means for flexing clothes in said container; pumping means; recirculation conduit means connected with said pumping means for passing water from said container means through said pumping means and back into contact with the clothes in said container means; means for simultaneously operating said flexing means and said pumping means; a compartment including electric discharge means of the type suitable for generating the oxidizing agents ozone and hydrogen peroxide from oxygen and water respectively, said compartment having inlet means and outlet means; air circulating means having an outlet connected to said compartment inlet means and having a pair of inlets, one of said inlets being connected to receive atmospheric air and the other of said inlets being connected to said compartment outlet means for recirculation of air through said compartment; and connecting conduit means also connected to said compartment outlet means and extending into said recirculation conduit means for introduction of part of the air leaving said compartment into said recirculation conduit means.

References Cited in the file of this patent

UNITED STATES PATENTS

| | | |
|---|---|---|
| 2,712,748 | Edwards et al. | July 12, 1955 |
| 2,983,130 | Pinder | May 9, 1961 |

FOREIGN PATENTS

| | | |
|---|---|---|
| 204,514 | Austria | July 25, 1959 |
| 842,165 | Great Britain | July 20, 1960 |